(12) United States Patent 
Maki et al.

(10) Patent No.: US 12,638,331 B2
(45) Date of Patent: May 26, 2026

(54) COLORIMETER AND CHROMATICITY MEASUREMENT METHOD

(71) Applicant: Yokogawa Electric Corporation, Tokyo (JP)

(72) Inventors: Ryutaro Maki, Musashino (JP); Kazufumi Nishida, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 287 days.

(21) Appl. No.: 18/201,857

(22) Filed: May 25, 2023

(65) Prior Publication Data

US 2023/0384159 A1      Nov. 30, 2023

(30) Foreign Application Priority Data

May 30, 2022      (JP) ................................. 2022-087883

(51) Int. Cl.
*G01J 3/50* (2006.01)
*G01J 3/02* (2006.01)
*G01J 3/10* (2006.01)

(52) U.S. Cl.
CPC ............. *G01J 3/501* (2013.01); *G01J 3/0251* (2013.01); *G01J 3/10* (2013.01); *G01J 2003/102* (2013.01)

(58) Field of Classification Search
CPC .. G01J 3/501; G01J 3/0251; G01J 3/10; G01J 2003/102; G01J 3/42; G01J 2003/468;
(Continued)

(56) References Cited

U.S. PATENT DOCUMENTS

2004/0150828 A1* 8/2004 Hendrix ................ G01J 3/0218
356/369
2006/0203240 A1* 9/2006 Ingleson ................... G01J 3/10
356/319
(Continued)

FOREIGN PATENT DOCUMENTS

CN        209117182 U      7/2019
EP        3736550 A1      11/2020
(Continued)

OTHER PUBLICATIONS

Korean Office Action (KROA) dated Dec. 4, 2024 issued for Korean patent application No. 10-2023-0065482 and its English translation.
(Continued)

*Primary Examiner* — Tarifur R Chowdhury
*Assistant Examiner* — Akbar H. Rizvi
(74) *Attorney, Agent, or Firm* — RANKIN, HILL & CLARK LLP

(57)        ABSTRACT

A colorimeter 1 that measures a chromaticity of a measured object A comprises: a first light source unit 11 that emits first irradiation light having a first spectrum S1; a second light source unit 12 that emits second irradiation light having a second spectrum S2 different from the first spectrum S1; an integrating sphere 61 that has irradiation light including the first irradiation light and the second irradiation light incident thereon; a light receiver 20 that detects measured light resulting from irradiation of the measured object A with the irradiation light emitted from the integrating sphere 61; and a controller 50 that calculates an optical spectrum of the measured light based on a detection signal of the measured light. A superimposed spectrum S of the first spectrum S1 and the second spectrum S2 corresponds to a reference spectrum S0 of a standard light source as reference for calculating the chromaticity.

5 Claims, 11 Drawing Sheets

(58) Field of Classification Search
    CPC ...... G01J 3/46; G01J 3/027; G01J 3/28; G01J
                                      2003/003; G01N 21/251
    See application file for complete search history.

(56)                    References Cited

U.S. PATENT DOCUMENTS

| | | | |
|---|---|---|---|
| 2009/0242803 A1* | 10/2009 | Imura | G01N 21/645 |
| | | | 250/578.1 |
| 2010/0148083 A1 | 6/2010 | Brown et al. | |
| 2014/0080230 A1* | 3/2014 | Sohn | H01L 22/10 |
| | | | 438/7 |
| 2018/0341208 A1 | 11/2018 | Nakamura | |
| 2021/0225814 A1 | 7/2021 | Ueno et al. | |

FOREIGN PATENT DOCUMENTS

| | | | |
|---|---|---|---|
| JP | H11160151 A | 6/1999 | |
| JP | 2009236486 A | 10/2009 | |
| JP | 2010523984 A | 7/2010 | |
| JP | 2018197775 A | 12/2018 | |
| JP | 2019-078715 A | 5/2019 | |
| JP | 2020193928 A | 12/2020 | |
| WO | 2019/087232 A1 | 5/2019 | |

OTHER PUBLICATIONS

Japanese Office Action (JPOA1) dated Feb. 25, 2025 for Japanese
Patent Application No. 2022-087883; English machine translation.
Japanese Office Action (JPOA2) dated May 20, 2025 for Japanese
Patent Application No. 2022-087883; English machine translation.
Japanese Office Action dated Oct. 21, 2025 for Japanese Patent
Application No. 2022-087883; English machine translation.

* cited by examiner

WAVELENGTH[nm]

COUNT[a.u.]

a. LIGHT SOURCE INTENSITY
b. REFLECTED LIGHT INTENSITY
c. FLUORESCENCE INTENSITY
d. APPARENT REFLECTION INTENSITY
z. APPARENT REFLECTANCE

REFLECTANCE [%]

LIGHT INTENSITY

WAVELENGTH [nm]

a. LIGHT SOURCE INTENSITY          d. APPARENT REFLECTION INTENSITY
b. REFLECTED LIGHT INTENSITY    ● z. APPARENT REFLECTANCE
c. FLUORESCENCE INTENSITY

REFLECTANCE[%]

WAVELENGTH[nm]

LIGHT INTENSITY

COLORIMETER AND CHROMATICITY MEASUREMENT METHOD

CROSS-REFERENCE TO RELATED APPLICATION

The present application claims priority to and the benefit of Japanese Patent Application No. 2022-087883 filed May 30, 2022, the entire contents of which are incorporated herein by reference.

TECHNICAL FIELD

The present disclosure relates to a colorimeter and a chromaticity measurement method.

BACKGROUND

Techniques related to color measurement of numerically measuring the color of an object to be measured (hereafter referred to as "measured object") such as paper are conventionally known.

For example, JP 2019-078715 A (PTL 1) discloses a spectrometric apparatus capable of, for example in the case where an image printed on paper by a printer includes an image formed with ink of a fluorescent color such as fluorescent pink or fluorescent yellow, accurately measuring the fluorescence property of each of a plurality of types of fluorescence by fluorescence measurement using, as a light source, light in a wavelength region longer than a violet light emitting diode (LED) and an ultraviolet LED.

CITATION LIST

Patent Literature

PTL 1: JP 2019-078715 A

SUMMARY

A colorimeter according to some embodiments is a colorimeter configured to measure a chromaticity of a measured object, comprising: a first light source unit configured to emit first irradiation light having a first spectrum; a second light source unit configured to emit second irradiation light having a second spectrum different from the first spectrum; an integrating sphere configured to have irradiation light including the first irradiation light and the second irradiation light incident thereon; a light receiver configured to detect measured light resulting from irradiation of the measured object with the irradiation light emitted from the integrating sphere; and a controller configured to calculate an optical spectrum of the measured light based on a detection signal of the measured light, wherein a superimposed spectrum of the first spectrum and the second spectrum corresponds to a reference spectrum of a standard light source as a reference for calculating the chromaticity.

DETAILED DESCRIPTION

Figure 1:
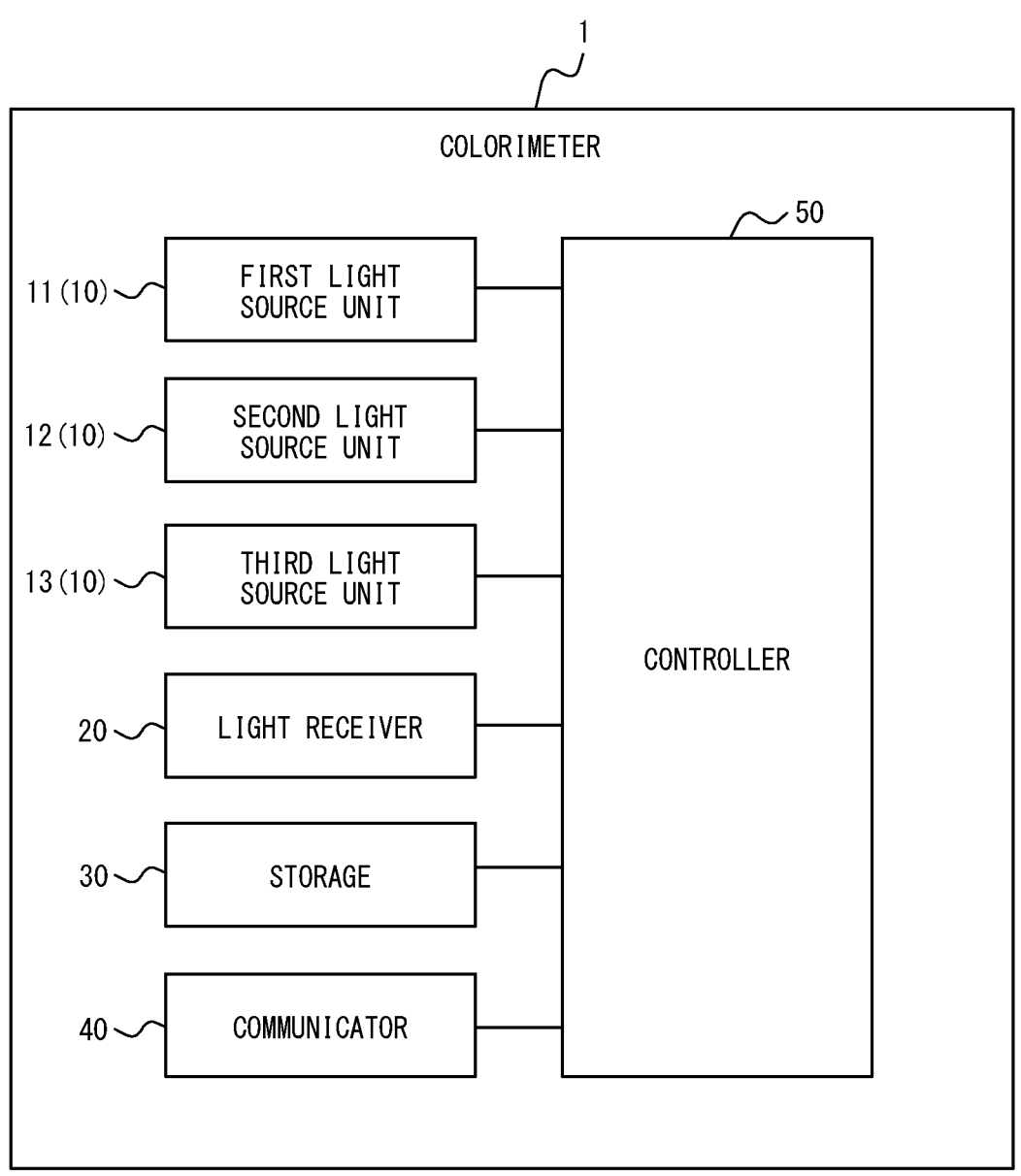
FIG. 1 is a functional block diagram illustrating a schematic structure of a colorimeter according to an embodiment of the present disclosure.

For example, a typical colorimeter uses an LED as a white light source. The reflectance when a measured object is irradiated with white light from the white LED light source is measured. The chromaticity value in a standard light source environment is then calculated in order to numerically output the color of the measured object. Here, the spectrum of the white light emitted from the white LED light source has a wavelength region in which the intensity is significantly lower than that of the reference spectrum of the standard light source. When fluorescence is generated from the measured object in such a wavelength region, the influence of the fluorescence spectrum on the spectrum of the white light increases, making it difficult to accurately calculate the reflectance and the chromaticity value. The invention described in PTL 1 fails to address this problem.

It could therefore be helpful to provide a colorimeter and a chromaticity measurement method capable of measuring the chromaticity of a measured object more accurately.

A colorimeter according to some embodiments is a colorimeter configured to measure a chromaticity of a measured object, comprising: a first light source unit configured to emit first irradiation light having a first spectrum; a second light source unit configured to emit second irradiation light having a second spectrum different from the first spectrum; an integrating sphere configured to have irradiation light including the first irradiation light and the second irradiation light incident thereon; a light receiver configured to detect measured light resulting from irradiation of the measured object with the irradiation light emitted from the integrating sphere; and a controller configured to calculate an optical spectrum of the measured light based on a detection signal of the measured light, wherein a superimposed spectrum of the first spectrum and the second spectrum corresponds to a reference spectrum of a standard light source as a reference for calculating the chromaticity.

Thus, the chromaticity of the measured object can be measured more accurately. The colorimeter includes, in addition to the first light source unit, the second light source unit that emits the second irradiation light having the second spectrum whose superimposed spectrum with the first spectrum corresponds to the reference spectrum of the standard light source as the reference for calculating the chromaticity. In the superimposed spectrum, the wavelength region in which the intensity decreases extremely is reduced as compared with the conventional case using a white LED light source alone. That is, the profile of the superimposed spectrum of the first spectrum and the second spectrum approximates the profile of the reference spectrum of the standard light source. This makes it possible to suppress the influence of fluorescence caused by the difference between the standard light source and the light source used.

In the colorimeter according to one embodiment, a center wavelength of the second spectrum may be located at a tail or a dip of the first spectrum. For example, as a result of the center wavelength of the second spectrum being located at the tail of the first spectrum, the wavelength band of the superimposed spectrum can be widened in accordance with the reference spectrum of the standard light source having a wider wavelength band than the first spectrum. Consequently, the foregoing effect of suppressing the influence of fluorescence can be equally achieved in the wavelength region where the tail of the first spectrum is located.

The colorimeter according to one embodiment may comprise a third light source unit configured to emit third irradiation light having a third spectrum different from the first spectrum and the second spectrum, the irradiation light may include the first irradiation light, the second irradiation light, and the third irradiation light, and a superimposed spectrum of the first spectrum, the second spectrum, and the third spectrum may correspond to the reference spectrum. Thus, the profile of the superimposed spectrum of the first spectrum, the second spectrum, and the third spectrum approximates the profile of the reference spectrum of the standard light source more closely.

In the colorimeter according to one embodiment, a center wavelength of the third spectrum may be located at a tail or a dip of the first spectrum. For example, as a result of the center wavelength of the third spectrum being located at the dip of the first spectrum, the foregoing effect of suppressing the influence of fluorescence can be equally achieved in the wavelength region where the dip of the first spectrum is located.

In the colorimeter according to one embodiment, the first light source unit may include a white LED light source, and the first irradiation light may include white light. Thus, the first spectrum having a profile close to the reference spectrum of the standard light source can be obtained in most of the visible light wavelength region except the wavelength regions where the tail and dip of the first spectrum are located.

In the colorimeter according to one embodiment, the measured light may include reflected light resulting from diffuse reflection of the irradiation light by the measured object. Such a colorimeter can more accurately measure the chromaticity excluding specularly reflected light.

In the colorimeter according to one embodiment, the superimposed spectrum may correspond to a reference spectrum of a D65 standard light source as the reference for calculating the chromaticity. Such a colorimeter can perform the measurement process in compliance with the international standard using the D65 standard light source.

In the colorimeter according to one embodiment, the controller may be configured to, in the case where the chromaticity of the measured object is determined to be inappropriate, feedback-control an upstream operation end in a production line of the measured object to optimize the chromaticity. In this way, the production process of the measured object can be adjusted to optimize the chromaticity of the measured object. The colorimeter can thus improve the quality of the measured object produced on the production line.

A chromaticity measurement method according to some embodiments is a chromaticity measurement method of measuring a chromaticity of a measured object, comprising: emitting first irradiation light having a first spectrum; emitting second irradiation light having a second spectrum different from the first spectrum; causing irradiation light including the first irradiation light and the second irradiation light to be incident on an integrating sphere; irradiating the measured object with the irradiation light emitted from the integrating sphere; detecting measured light resulting from irradiation of the measured object with the irradiation light emitted from the integrating sphere; and calculating an optical spectrum of the measured light based on a detection signal of the measured light, wherein a superimposed spectrum of the first spectrum and the second spectrum corresponds to a reference spectrum of a standard light source as a reference for calculating the chromaticity.

Thus, the chromaticity of the measured object can be measured more accurately. A colorimeter that carries out the chromaticity measurement method emits the second irradiation light having the second spectrum whose superimposed spectrum with the first spectrum corresponds to the reference spectrum of the standard light source as the reference for calculating the chromaticity. In the superimposed spectrum, the wavelength region in which the intensity decreases extremely is reduced as compared with the conventional case using a white LED light source alone. That is, the profile of the superimposed spectrum of the first spectrum and the second spectrum approximates the profile of the reference spectrum of the standard light source. This makes it possible to suppress the influence of fluorescence caused by the difference between the standard light source and the light source used.

It is thus possible to provide a colorimeter and a chromaticity measurement method capable of measuring the chromaticity of a measured object more accurately.

The background and problems of the conventional techniques will be described in more detail below.

Conventionally, a colorimeter is incorporated into the production process of a measured object, such as paper being made, and numerically outputs the color of the measured object. In some cases, the colorimeter feedback-controls the upstream operation ends in the production line of the measured object so that the color of the measured object will be constant, and performs production management to ensure that the color of the measured object is within a certain numerical range.

The numerical value representing the color of the measured object varies depending on the irradiation light applied to the measured object from the light source. Accordingly, the International Commission on Illumination (CIE), etc. define standard light sources for color measurement of measured objects. A typical colorimeter uses an LED as a white light source. The reflectance when the measured object is irradiated with white light from the white LED light source is measured. The chromaticity value in a standard light source environment is then calculated in order to numerically output the color of the measured object.

More specifically, using reflectance data acquired using the white LED light source and spectral data of any virtual light source including the standard light source, the chromaticity value under the virtual light source can be easily calculated. Here, it is possible to take advantage of the features of LEDs such as space saving, ease of on/off control, and low cost.

However, conventional reflectance measurement type colorimeters have a problem in that, in the case where fluorescence is generated from the measured object, the reflectance varies depending on the light source used. Fluorescence means, for example, a phenomenon in which the measured object absorbs light in a certain short wavelength region and emits light in a region on the longer wavelength side than the absorption wavelength. For example, the spectrum of white light emitted from the white LED light source has a wavelength region in which the intensity is significantly lower than that of the reference spectrum of the standard light source. When fluorescence is generated from the measured object in such a wavelength region, the influence of the fluorescence spectrum on the spectrum of the white light increases, making it difficult to accurately calculate the reflectance and the chromaticity value.

The influence of fluorescence on reflectance will be briefly described below, with reference to FIGS. 8 to 11.

Figure 8:
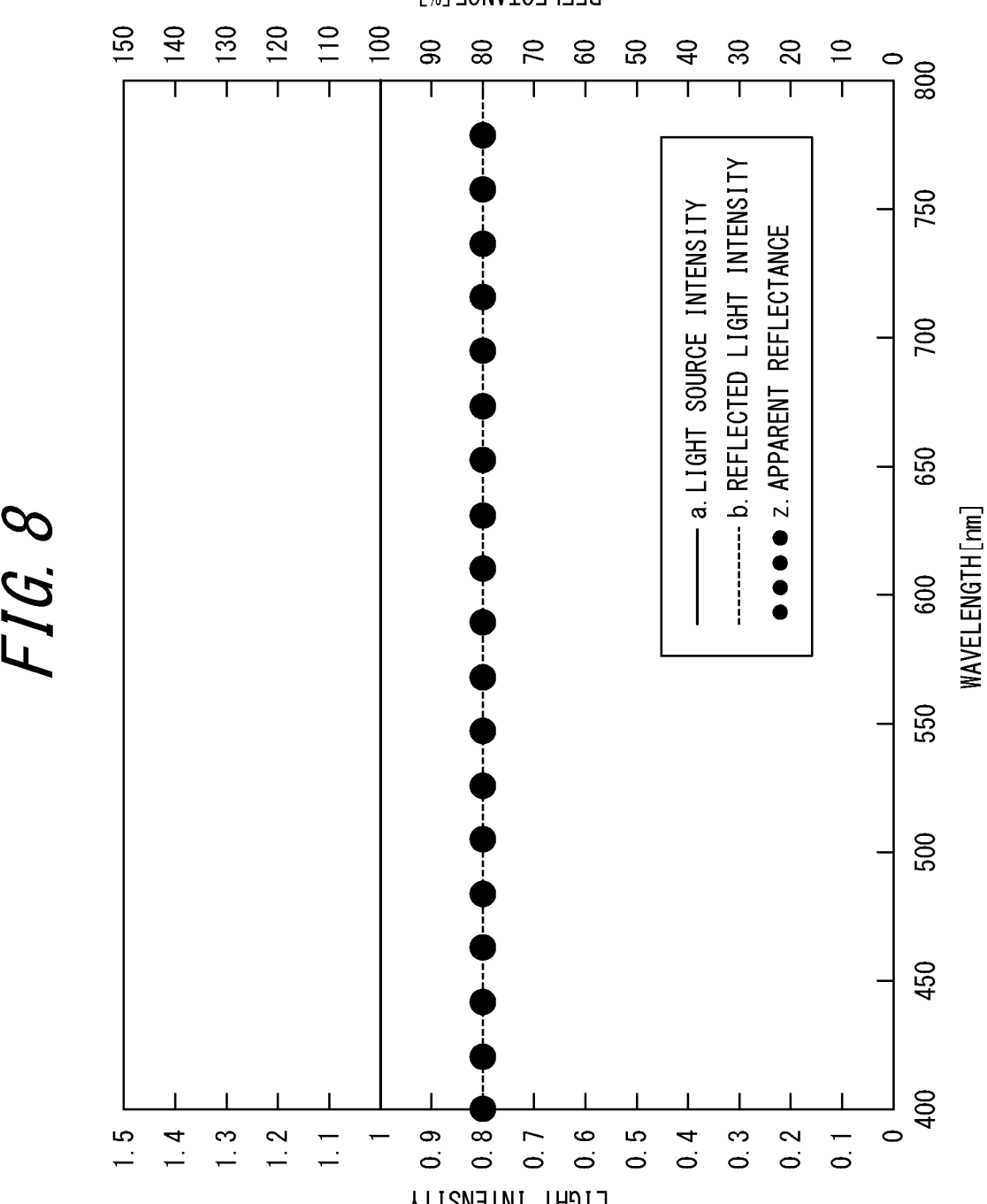
FIG. 8 is a first diagram for explaining the influence of fluorescence on reflectance.
Figure 9:
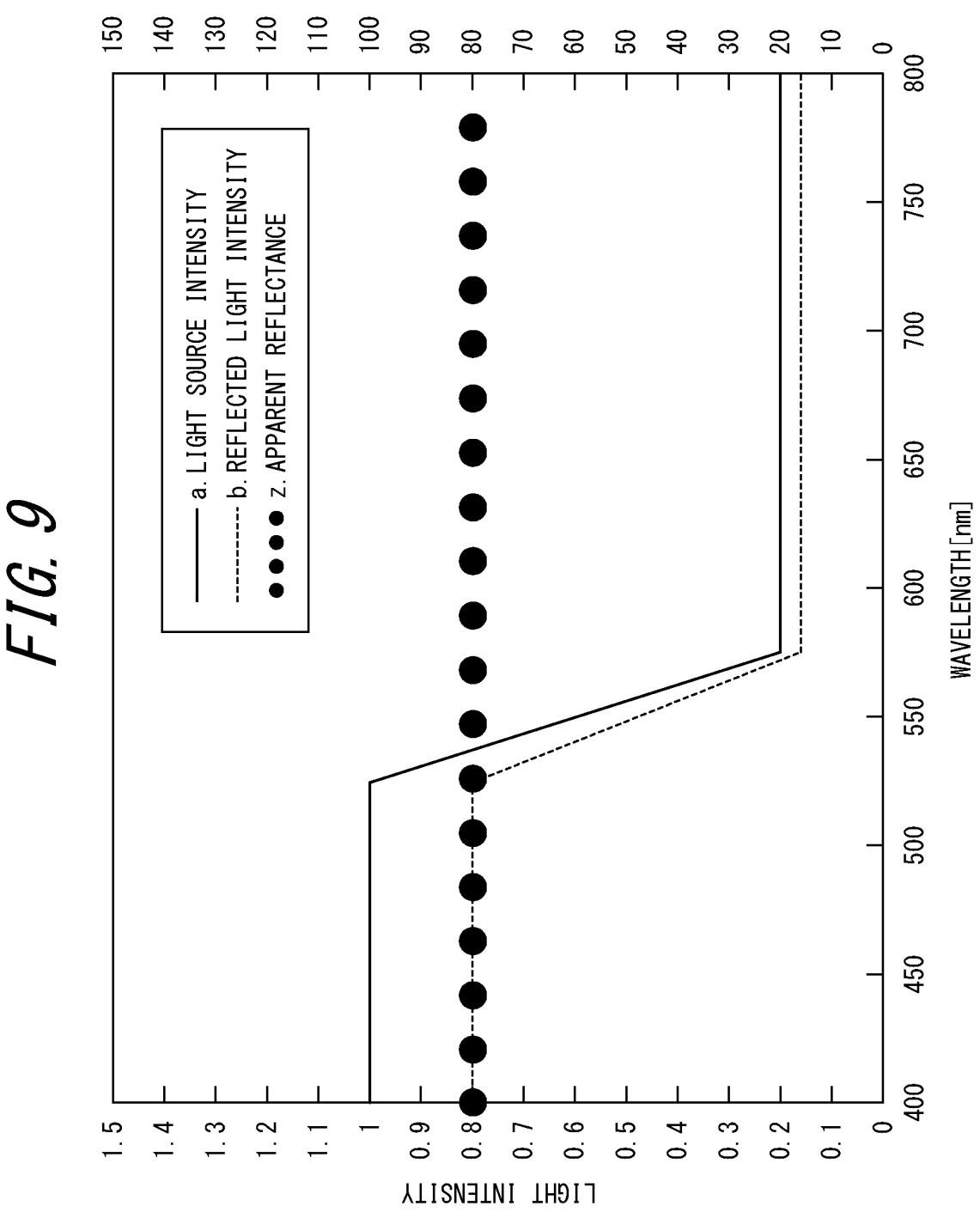
FIG. 9 is a second diagram for explaining the influence of fluorescence on reflectance.

FIG. 8 is a first diagram for explaining the influence of fluorescence on reflectance. FIG. 9 is a second diagram for explaining the influence of fluorescence on reflectance. FIGS. 8 and 9 illustrate an example in which the reflectance is 80% in the entire wavelength region and there is no fluorescence. FIG. 8 illustrates an example of using a broad light source whose emission intensity is constant in the entire wavelength region. FIG. 9 illustrates an example of using a non-broad light source whose emission intensity decreases on the long wavelength side. In each drawing, the solid line indicates the emission intensity of the light source, the dashed line indicates the intensity of reflected light reflected by the measured object, and the round dots indicate the apparent reflectance.

In each drawing, reflected light intensity b is 80% of light source intensity a. Apparent reflectance z is calculated as apparent reflectance z=reflected light intensity b/light source intensity a, and is a constant value independent of the spectral distribution of the light source.

Figure 10:
FIG. 10 is a third diagram for explaining the influence of fluorescence on reflectance.
Figure 11:
FIG. 11 is a fourth diagram for explaining the influence of fluorescence on reflectance.

FIG. 10 is a third diagram for explaining the influence of fluorescence on reflectance. FIG. 11 is a fourth diagram for explaining the influence of fluorescence on reflectance. FIGS. 10 and 11 illustrate an example in which the reflectance is 80% in the entire wavelength region and fluorescence based on light absorbed at a wavelength of 450 nm is generated at an intensity of about 10% in a wavelength region on the longer wavelength side than a wavelength of 650 nm.

FIG. 10 illustrates an example of using a broad light source whose emission intensity is constant in the entire wavelength region, and corresponds to FIG. 8. FIG. 11 illustrates an example of using a non-broad light source whose emission intensity decreases on the long wavelength side, and corresponds to FIG. 9. In each drawing, the solid line indicates the emission intensity of the light source, the dashed line indicates the intensity of reflected light reflected by the measured object, the dashed-dotted line indicates the intensity of fluorescence generated from the measured object, the double line indicates the apparent reflection intensity of light which is the sum of the intensity of reflected light and the intensity of fluorescence, and the round dots indicate the apparent reflectance.

In each drawing, reflected light intensity b is 80% of light source intensity a. Meanwhile, fluorescence intensity c has a predetermined value in a wavelength region on the longer wavelength side than a wavelength of 650 nm. A detector of a spectroscope cannot distinguish between the light intensity derived from reflection and the light intensity derived from fluorescence. Therefore, apparent reflection intensity d detected by the detector is the sum of reflected light intensity b and fluorescence intensity c. In this case, apparent reflectance z is as follows.

$$\text{Apparent reflectance } z = \text{apparent reflection intensity}$$
$$d/\text{light source intensity } a = (\text{reflected light intensity } b + \text{fluorescence intensity } c)/\text{light source intensity } a = (\text{light source intensity } a \times \text{reflectance} + \text{fluorescence intensity } c)/\text{light source intensity } a = \text{reflectance} + \text{fluorescence intensity } c/\text{light source intensity } a.$$

Thus, apparent reflectance z exceeds the actual reflectance depending on the ratio of fluorescence intensity c to light source intensity a. When light source intensity a, i.e. the intensity of irradiation light from the light source to the measured object, is lower relative to fluorescence intensity c, apparent reflectance z is higher.

As described above, for example in the case where the spectrum of white light emitted from the white LED light source has a wavelength region in which the intensity is significantly lower than that of the reference spectrum of the standard light source, if fluorescence is generated from the measured object in such a wavelength region, the measured reflectance differs greatly between the white LED light source and the standard light source. This makes it difficult to accurately calculate the reflectance and the chromaticity value.

Fluorescence observations are reported on BCRA II tiles, which are used worldwide in the pricing, calibration, and inspection of colorimeters. Hence, even a colorimeter put into practical use for measuring the chromaticity of a measured object that does not generate fluorescence is exposed to the foregoing problem related to fluorescence at the stages of pricing, calibration, and inspection.

To solve the problem stated above, it could be helpful to provide a colorimeter and a chromaticity measurement method capable of measuring the chromaticity of a measured object more accurately. An embodiment of the present disclosure will be mainly described below with reference to the accompanying drawings.

Figure 2:
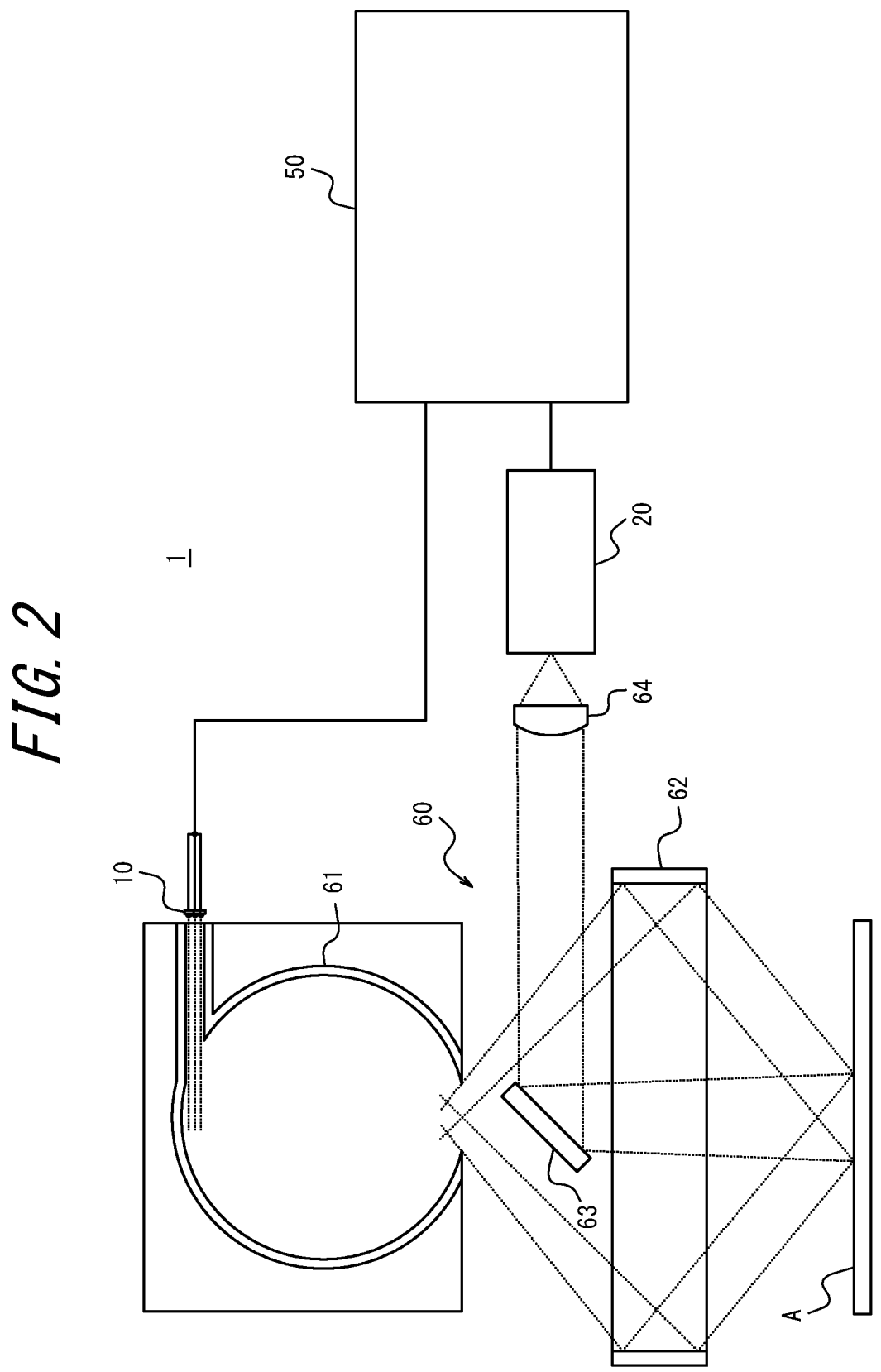
FIG. 2 is a schematic diagram illustrating a schematic structure of the colorimeter in FIG. 1.

FIG. 1 is a functional block diagram illustrating a schematic structure of a colorimeter 1 according to an embodiment of the present disclosure. FIG. 2 is a schematic diagram illustrating a schematic structure of the colorimeter 1 in FIG. 1.

The colorimeter 1 measures the chromaticity of a measured object (i.e. an object to be measured) A. In this specification, the term "measured object" includes, for example, paper. As illustrated in FIG. 1, the colorimeter 1 includes a first light source unit 11, a second light source unit 12, a third light source unit 13, a light receiver 20, a storage 30, a communicator 40, and a controller 50. Hereinafter, the first light source unit 11, the second light source unit 12, and the third light source unit 13 are also collectively referred to as simply "light source units 10".

The first light source unit 11 emits first irradiation light having a first spectrum. The first light source unit 11 includes a white LED light source. The first irradiation light emitted from the white LED light source includes white light.

The second light source unit 12 emits second irradiation light having a second spectrum different from the first spectrum. The second light source unit 12 includes an LED light source with a peak wavelength of 700 nm and a full width at half maximum of 50 nm.

The third light source unit 13 emits third irradiation light having a third spectrum different from the first spectrum and the second spectrum. The third light source unit 13 includes an LED light source with a peak wavelength of 485 nm and a full width at half maximum of 50 nm.

The light receiver 20 detects light to be measured (hereafter referred to as "measured light") resulting from irradiation of the measured object A with irradiation light including the first irradiation light, the second irradiation light, and the third irradiation light. In this specification, the term "measured light" includes, for example, reflected light resulting from diffuse reflection of the irradiation light by the measured object A. That is, the measured light includes diffusely reflected light other than specularly reflected light, from among the reflected light. The light receiver 20 includes a spectroscope capable of detecting and dispersing the measured light. The wavelength band of the spectroscope matches the wavelength band of the irradiation light.

The storage 30 includes any storage module such as a hard disk drive (HDD), a solid state drive (SSD), electrically erasable programmable read-only memory (EEPROM), read-only memory (ROM), and random access memory (RAM). For example, the storage 30 functions as a main storage device, an auxiliary storage device, or cache memory. The storage 30 stores any information used for the operation of the colorimeter 1. The storage 30 stores the intensity of the measured light detected by the light receiver 20. The storage 30 stores information calculated by the controller 50. The storage 30 stores a system program, application programs, and the like. The storage 30 is not limited to being built in the colorimeter 1, and may include any external storage module connected via a digital input/output port such as Universal Serial Bus (USB).

The communicator 40 includes any communication module that is communicably connected to various operation ends installed on the production line that produces the measured object A. In this specification, the term "operation end" includes, for example, a nozzle for squeezing a material, a slit, and the like. The colorimeter 1 is communicably connected to various operation ends installed on the production line via the communicator 40. The controller 50 can transmit control information for each operation end to the operation end via the communicator 40. The controller 50 can receive information about the operating state of each operation end from the operation end via the communicator 40.

The controller 50 includes one or more processors. In one embodiment, the term "processor" refers to, but is not limited to, a general-purpose processor or a dedicated processor specialized for a specific process. The controller 50 is communicably connected to each component in the colorimeter 1, and controls the overall operation of the colorimeter 1.

The controller 50 controls the light source units 10 to adjust the irradiation timings of the first irradiation light, the second irradiation light, and the third irradiation light. For example, the controller 50 controls the first light source unit 11, the second light source unit 12, and the third light source unit 13 to emit the first irradiation light, the second irradiation light, and the third irradiation light simultaneously.

The controller 50 calculates the optical spectrum of the measured light based on the detection signal of the measured light output from the light receiver 20. In this specification, the term "optical spectrum" includes, for example, the wavelength dependence of the intensity of reflected light as the measured light, the wavelength dependence of the reflectance of the measured object A that can be calculated from the foregoing wavelength dependence, and the like.

With reference to FIG. 2, the colorimeter 1 includes an optical system in addition to the components illustrated in FIG. 1. The optical system 60 forms an optical path from the light source units 10 to the light receiver 20. The optical system 60 includes an integrating sphere 61, a cylindrical mirror 62, a mirror 63, and a condenser lens 64.

The irradiation light including the first irradiation light, the second irradiation light, and the third irradiation light emitted respectively from the first light source unit 11, the second light source unit 12, and the third light source unit 13 is incident on the integrating sphere 61. The integrating sphere 61 is used to convert a directional light source such as an LED included in each of the first light source unit 11, the second light source unit 12, and the third light source unit 13 into an isotropic homogeneous light source. The irradiation light including the first irradiation light, the second irradiation light, and the third irradiation light diffuses while being repeatedly reflected on the inner surface of the integrating sphere 61, and becomes isotropic homogeneous light.

The irradiation light sufficiently diffused in the integrating sphere 61 is emitted from an opening formed in the lower part of the integrating sphere 61. Part of the irradiation light emitted from the integrating sphere 61 is reflected by the cylindrical mirror 62 located so as to surround the optical axis, and applied to the measured object A. Of the light diffusely reflected by the measured object A, the reflected light propagating vertically upward is detected as the measured light by the light receiver 20 via the mirror 63 and the condenser lens 64.

The controller 50 calculates the reflection intensity of the measured light using the spectroscope included in the light receiver 20. The controller 50 can calculate the reflectance of the measured object A, by storing the reflection intensity of light reflected by a reflection member having known reflectance in the storage 30 in advance. Since the irradiation light emitted from the integrating sphere 61 has a uniform spatial distribution, the measured object A is irradiated with the same intensity regardless of the direction. Therefore, even if the measured object A has directional characteristics of reflectance, the controller 50 can stably perform the reflectance measurement process regardless of the installation angle of the measured object A.

Figure 3:
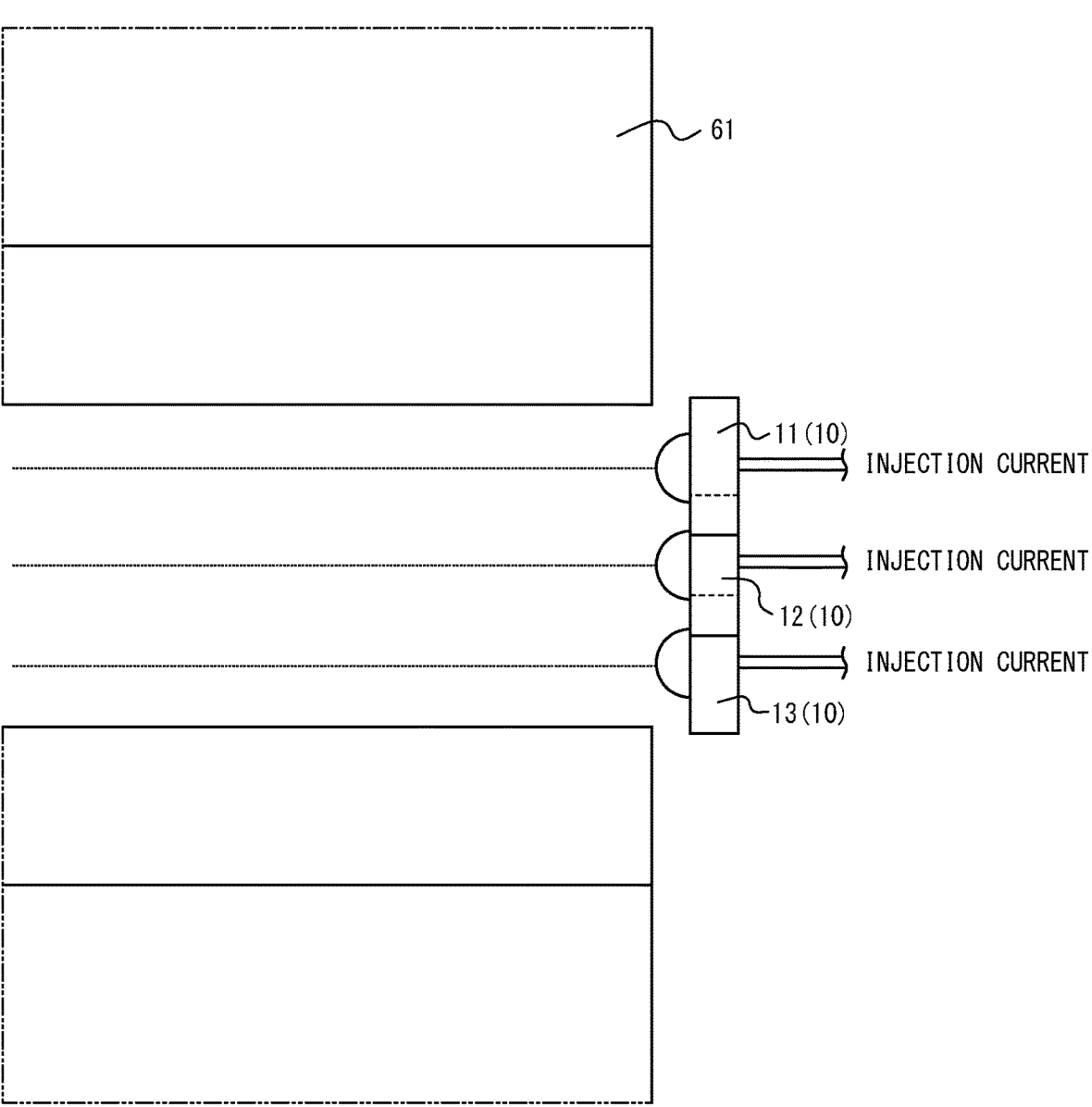
FIG. 3 is an enlarged schematic diagram mainly illustrating the light source units in FIG. 2.

FIG. 3 is an enlarged schematic diagram mainly illustrating the light source units 10 in FIG. 2. FIG. 3 illustrates how the three light sources, i.e. the first light source unit 11, the second light source unit 12, and the third light source unit 13, are arranged at the entrance of the integrating sphere 61.

The colorimeter 1 includes any number of auxiliary light sources in addition to the white LED light source included in the first light source unit 11. The second light source unit 12 and the third light source unit 13 are such auxiliary light sources. The irradiation light emitted from each of the first light source unit 11, the second light source unit 12, and the third light source unit 13, having being incident on the integrating sphere 61, is sufficiently diffused in the integrating sphere 61. Hence, the irradiation light is made uniform even in the case where it contains a plurality of rays.

By simultaneously turning on these auxiliary light sources in addition to the white LED light source, the colorimeter 1 causes the superimposed spectrum of the first spectrum, the second spectrum, and the third spectrum to correspond to a reference spectrum of a standard light source. More specifically, the colorimeter 1 approximates the superimposed spectrum to the reference spectrum. In this specification, the term "standard light source" includes, for example, a D65 standard light source.

Figure 4:
FIG. 4 is a graph illustrating a first spectrum of a white LED light source included in the first light source unit in FIG. 1.

FIG. 4 is a graph illustrating the first spectrum S1 of the white LED light source included in the first light source unit

Figure 5:
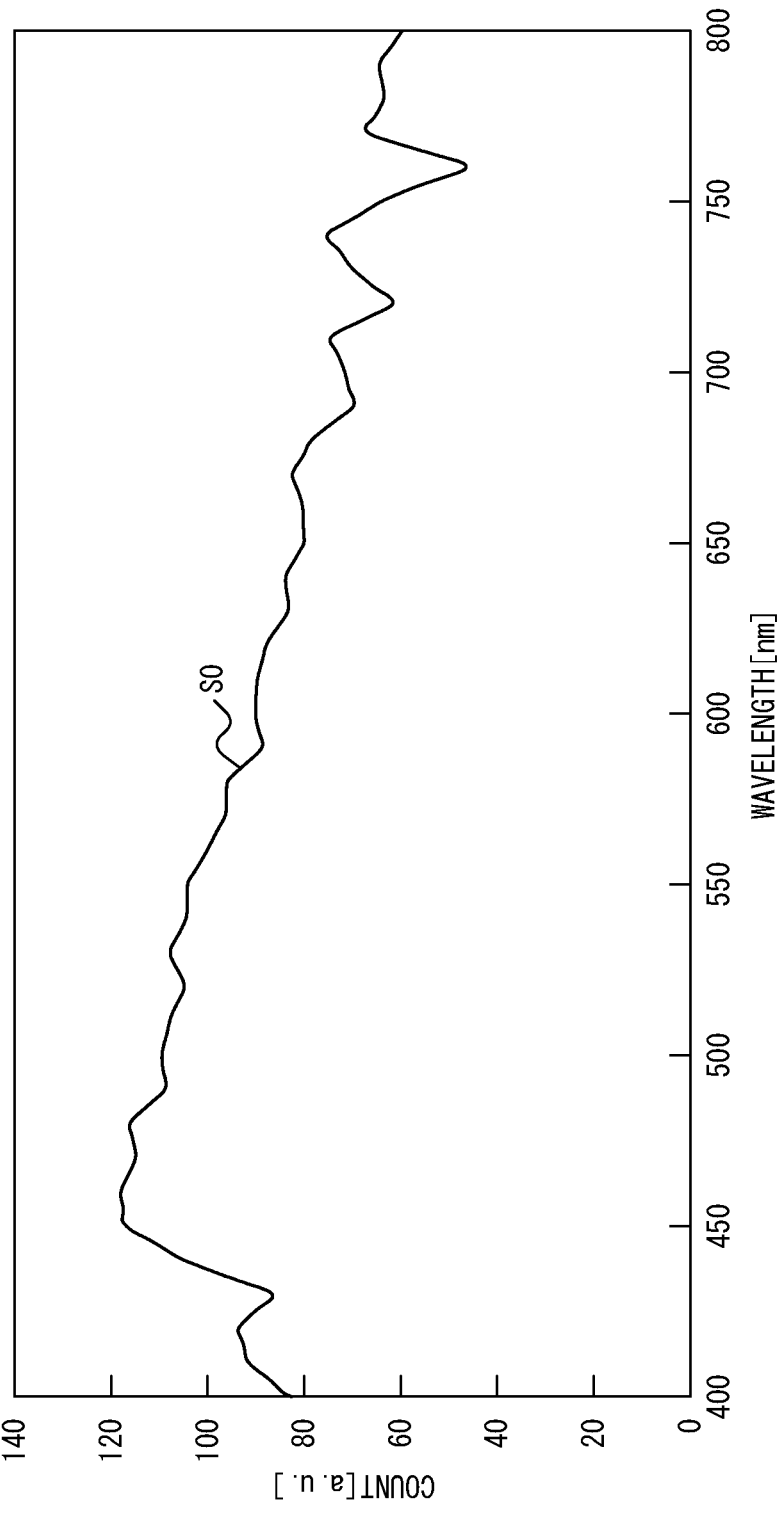
FIG. 5 is a graph illustrating the reference spectrum of a D65 standard light source.
Figure 6:
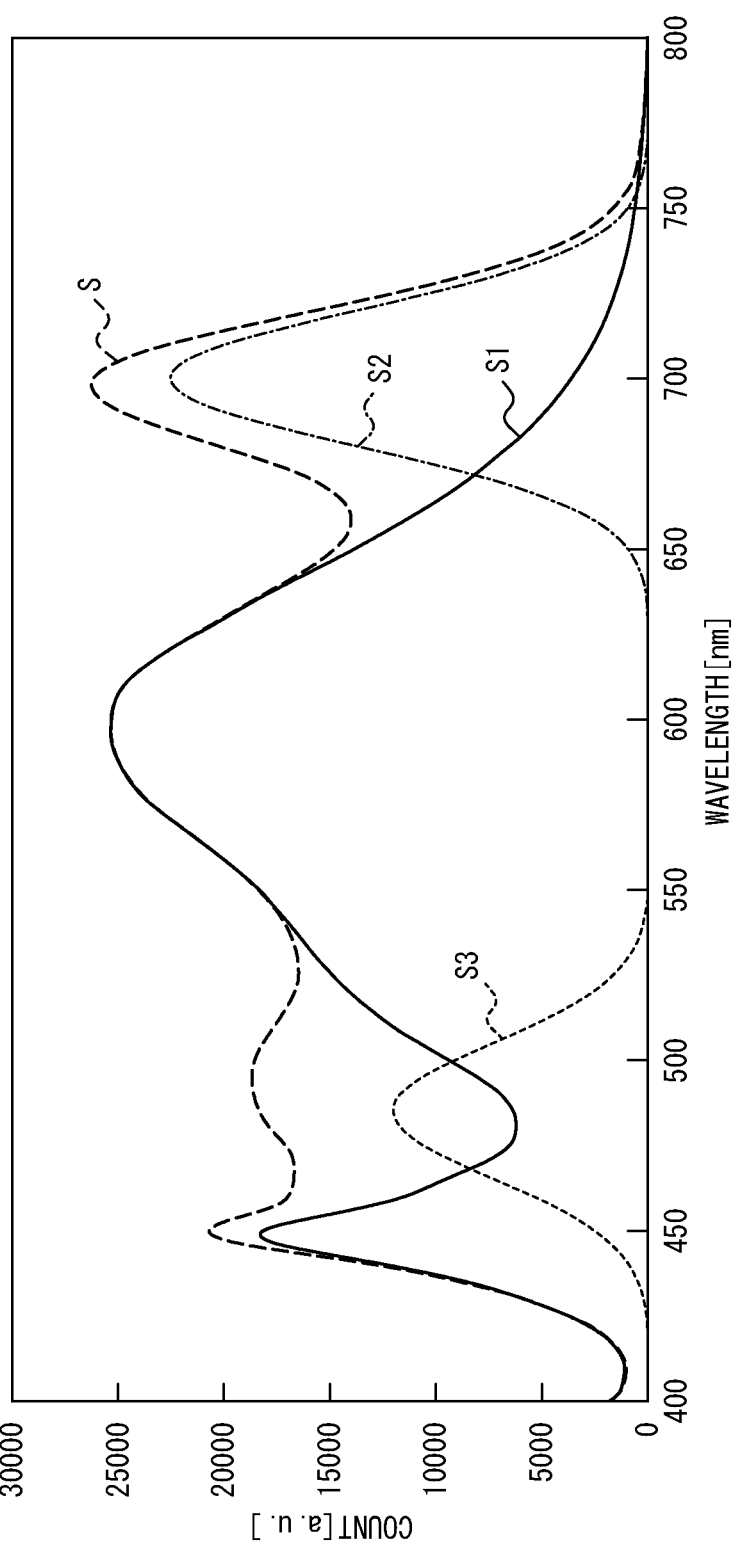
FIG. 6 is a graph illustrating a superimposed spectrum based on the first light source unit, the second light source unit, and the third light source unit in FIG. 1.

11 in FIG. 1. FIG. 5 is a graph illustrating the reference spectrum S0 of the D65 standard light source. FIG. 6 is a graph illustrating the superimposed spectrum S based on the first light source unit 11, the second light source unit 12, and the third light source unit 13 in FIG. 1.

The reference spectrum S0 of the D65 standard light source has a broad shape, whereas the intensity of the first spectrum S1 of the typical white LED light source decreases significantly around wavelengths of 480 nm and 700 nm. More specifically, in the white LED light source, the emission intensity decreases significantly around a wavelength of 480 nm and in a wavelength region on the longer wavelength side than a wavelength of 675 nm, as illustrated in FIG. 4. In the reference spectrum S0 of the D65 standard light source, on the other hand, the changes in emission intensity are gentle and predetermined emission intensity is maintained in the same wavelength regions, as illustrated in FIG. 5.

Thus, particularly for the measured object A that generates fluorescence around a wavelength of 480 nm and in a wavelength region on the longer wavelength side than a wavelength of 675 nm, the reflectance measured using the white LED light source and the reflectance measured using the D65 standard light source differ greatly. In view of this, the colorimeter 1 includes the auxiliary light sources that emit light in the wavelength regions in which the first spectrum S1 of the first irradiation light is depressed as compared with the D65 standard light source.

In more detail, as illustrated in FIG. 6, the second light source unit 12 as an auxiliary light source emits the second irradiation light having the second spectrum S2 that mainly spreads in the wavelength region on the longer wavelength side than a wavelength of 675 nm. The second spectrum S2 has a peak wavelength of 700 nm and a full width at half maximum of 50 nm. The center wavelength of 700 nm of the second spectrum S2 is located at the tail of the first spectrum S1.

Likewise, the third light source unit 13 as an auxiliary light source emits the third irradiation light having the third spectrum S3 that mainly spreads around a wavelength of 480 nm. The third spectrum S3 has a peak wavelength of 485 nm and a full width at half maximum of 50 nm. The center wavelength of 485 nm of the third spectrum S3 is located at the dip of the first spectrum S1.

The superimposed spectrum S of the first spectrum S1 and the second spectrum S2 corresponds to the reference spectrum S0 of the D65 standard light source as the reference for calculating the chromaticity. More specifically, in the superimposed spectrum S, predetermined emission intensity is maintained in a wavelength region around a wavelength of 700 nm, i.e. in a wavelength region on the longer wavelength side than a wavelength of 675 nm, as in the reference spectrum S0. The superimposed spectrum S of the first spectrum S1, the second spectrum S2, and the third spectrum S3 corresponds to the reference spectrum S0. More specifically, in the superimposed spectrum S, predetermined emission intensity is maintained in a wavelength region around a wavelength of 700 nm, i.e. in a wavelength region on the longer wavelength side than a wavelength of 675 nm, and in a wavelength region around an wavelength of 485 nm, as in the reference spectrum S0.

The controller 50 changes the injection current value to the second light source unit 12 indicating the second spectrum S2 and the injection current value to the third light source unit 13 indicating the third spectrum S3 relative to the injection current value to the first light source unit 11 indicating the first spectrum S1, thus optimizing the balance of the respective emission intensities. The controller 50 controls the first light source unit 11, the second light source unit 12, and the third light source unit 13 to turn on the white LED light source and the two LED light sources as auxiliary light sources simultaneously. This enables the irradiation light emitted from the integrating sphere 61 to have the superimposed spectrum S in which depressions are suppressed as illustrated in FIG. 6.

Figure 7:
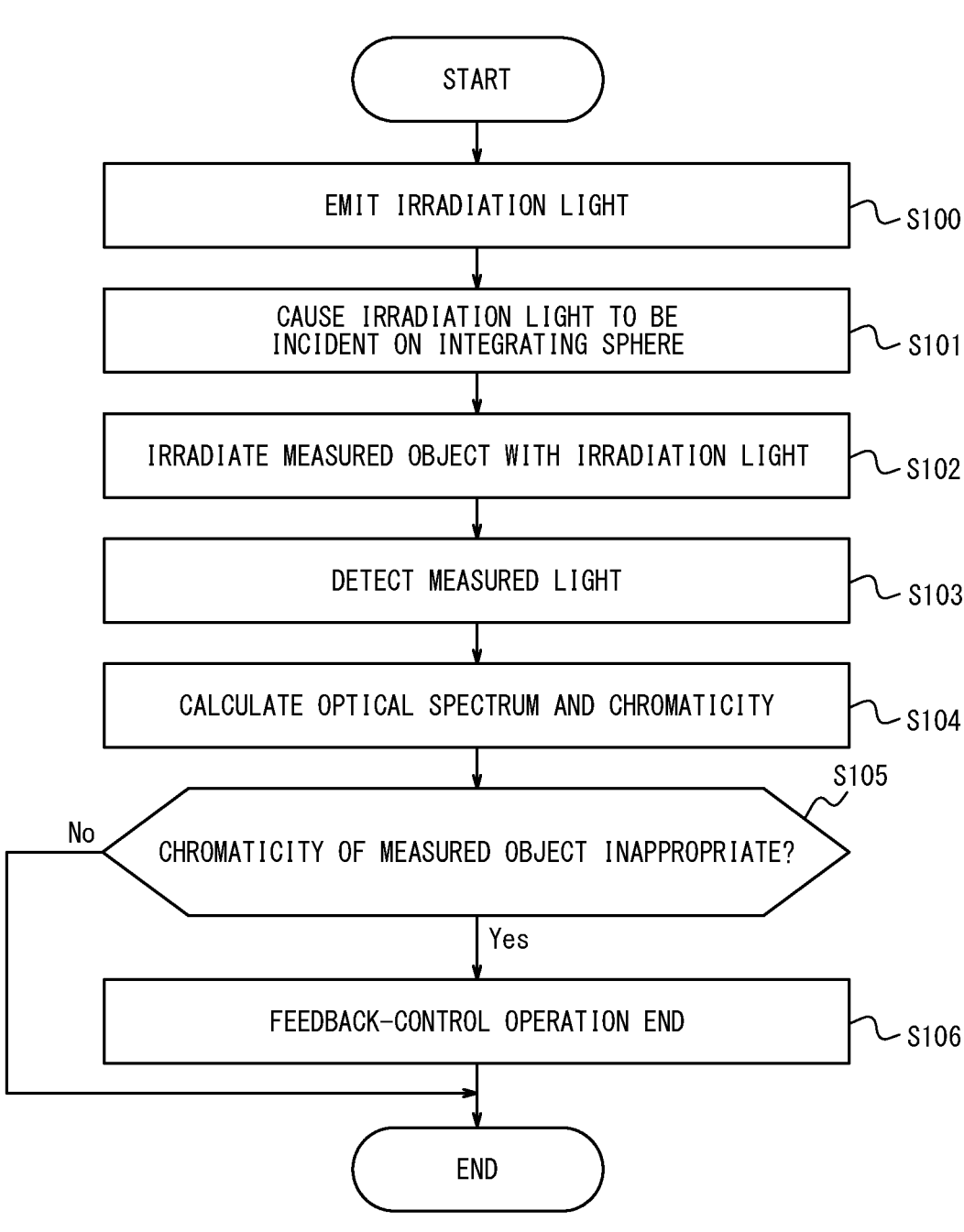
FIG. 7 is a flowchart for explaining an example of the operation of the colorimeter in FIG. 1.

FIG. 7 is a flowchart for explaining an example of the operation of the colorimeter 1 in FIG. 1. An example of an information processing method including a chromaticity measurement method performed by the colorimeter 1 in FIG. 1 will be described below, with reference to FIG. 7.

In step S100, the controller 50 in the colorimeter 1 emits irradiation light using the light source units 10. More specifically, the controller 50 emits the first irradiation light having the first spectrum S1 using the first light source unit 11. The controller 50 emits the second irradiation light having the second spectrum S2 that is different from the first spectrum S1 and whose superimposed spectrum S with the first spectrum S1 corresponds to the reference spectrum S0, using the second light source unit 12. The controller 50 emits the third irradiation light having the third spectrum S3 that is different from the first spectrum S1 and the second spectrum S2 and whose superimposed spectrum S with the first spectrum S1 and the second spectrum S2 corresponds to the reference spectrum S0, using the third light source unit 13. The irradiation light includes the first irradiation light, the second irradiation light, and the third irradiation light.

In step S101, the colorimeter 1 causes the irradiation light emitted in step S100 to be incident on the integrating sphere 61.

In step S102, the colorimeter 1 irradiates the measured object A with the irradiation light emitted from the integrating sphere 61 after entering the integrating sphere 61 in step S101.

In step S103, the colorimeter 1 detects measured light resulting from the irradiation of the measured object A with the irradiation light emitted from the integrating sphere 61 in step S102.

In step S104, the controller 50 in the colorimeter 1 calculates the optical spectrum of the measured light and the chromaticity of the measured object A based on the detection signal of the measured light acquired in step S103.

In step S105, the controller 50 determines whether the chromaticity of the measured object A is inappropriate. For example, in the case where the chromaticity of the measured object A deviates from the design specification value of the measured object A by a predetermined ratio or is non-uniform by position on the measured object A, the controller 50 determines that the chromaticity of the measured object A is inappropriate. In the case where the controller 50 determines that the chromaticity of the measured object A is inappropriate, the controller 50 performs the process in step S106. In the case where the controller 50 determines that the chromaticity of the measured object A is not inappropriate, that is, the chromaticity of the measured object A is appropriate, the controller 50 ends the procedure.

In the case where the controller 50 determines that the chromaticity of the measured object A is inappropriate in step S105, in step S106, the controller 50 feedback-controls the upstream operation ends in the production line of the measured object A to optimize the chromaticity of the measured object A.

With the colorimeter 1 according to the embodiment described above, the chromaticity of the measured object A can be measured more accurately. The colorimeter 1 includes, in addition to the first light source unit 11, the second light source unit 12 that emits the second irradiation light having the second spectrum S2 whose superimposed spectrum S with the first spectrum S1 corresponds to the reference spectrum S0 of the standard light source as the reference for calculating the chromaticity. In the superimposed spectrum S, the wavelength region in which the intensity decreases extremely is reduced as compared with the conventional case using a white LED light source alone. That is, the profile of the superimposed spectrum S of the first spectrum S1 and the second spectrum S2 approximates the profile of the reference spectrum S0 of the standard light source. This makes it possible to suppress the influence of fluorescence caused by the difference between the standard light source and the light source used.

For example, as illustrated in FIG. 6, in the superimposed spectrum S, predetermined emission intensity is maintained in the wavelength region around a wavelength of 700 nm, i.e. in the wavelength region on the longer wavelength side than a wavelength of 675 nm, as in the reference spectrum S0. Therefore, for example, even in the case where the measured object A is excited at a wavelength of 450 nm and generates fluorescence at a wavelength of 700 nm, the ratio of the fluorescence intensity to the emission intensity of the light source in the wavelength region around a wavelength of 700 nm decreases. The difference in measured reflectance between the light source capable of emitting irradiation light having the superimposed spectrum S and the standard light source is thus reduced. That is, it is possible to obtain data that more closely approximates the result of measuring the reflectance using the light source in accordance with the international standard. Consequently, the use of the colorimeter 1 eases accurate calculation of the reflectance and the chromaticity value.

Here, if predetermined emission intensity is maintained in the wavelength region in which fluorescence is generated in the superimposed spectrum S as in the reference spectrum S0, the reflectance and the chromaticity value can be calculated accurately even when the excitation wavelength is not specifically identified. In the case where the excitation wavelength is specifically identified, the reflectance and the chromaticity value can be calculated accurately without performing, for example, calibration work of exciting the measured object A only with the excitation wavelength and measuring the fluorescence spectrum in advance.

Hence, even at the stages of pricing, calibration, and inspection of the colorimeter 1, the influence of fluorescence can be suppressed to calculate the chromaticity value more accurately.

As a result of the center wavelength of the second spectrum S2 being located at the tail of the first spectrum S1 as illustrated in FIG. 6, the wavelength band of the superimposed spectrum S can be widened in accordance with the reference spectrum S0 of the standard light source having a wider wavelength band than the first spectrum S1. Consequently, the foregoing effect of suppressing the influence of fluorescence can be equally achieved in the wavelength region where the tail of the first spectrum S1 is located.

The colorimeter 1 includes the third light source unit 13 that emits the third irradiation light having the third spectrum S3 that is different from the first spectrum S1 and the second spectrum S2 and whose superimposed spectrum S with the first spectrum S1 and the second spectrum S2 corresponds to the reference spectrum S0. The irradiation light includes the first irradiation light, the second irradiation light, and the third irradiation light. Thus, the profile of the superimposed spectrum S of the first spectrum S1, the second spectrum S2, and the third spectrum S3 approximates the profile of the reference spectrum S0 of the standard light source more closely.

For example, it is possible to approximate the profile of the superimposed spectrum S to the profile of the reference spectrum S0 of the standard light source in the entire visible light wavelength region of the reference spectrum S0. Consequently, the foregoing effect of suppressing the influence of fluorescence can be equally achieved in the entire visible light wavelength region. Since the profile of the superimposed spectrum S can be approximated to the profile of the reference spectrum S0 of the standard light source in the entire visible light wavelength region, the influence of fluorescence can be equally suppressed even when the excitation wavelength is not specifically identified, that is, regardless of at which wavelength the measured object A is excited.

As a result of the center wavelength of the third spectrum S3 being located at the dip of the first spectrum S1 as illustrated in FIG. 6, the foregoing effect of suppressing the influence of fluorescence can be equally achieved in the wavelength region where the dip of the first spectrum S1 is located.

The first light source unit 11 includes a white LED light source, and the first irradiation light includes white light. Thus, the first spectrum S1 having a profile close to the reference spectrum S0 of the standard light source can be obtained in most of the visible light wavelength region except the wavelength regions where the tail and dip of the first spectrum S1 are located, as illustrated in FIG. 6.

As a result of the measured light including the reflected light generated by the diffuse reflection of the irradiated light by the measured object A, the colorimeter 1 can more accurately measure the chromaticity excluding specularly reflected light.

As a result of the superimposed spectrum S corresponding to the reference spectrum S0 of the D65 standard light source as the reference for calculating the chromaticity, the colorimeter 1 can perform the measurement process in compliance with the international standard using the D65 standard light source.

By feedback-controlling the upstream operation ends in the production line of the measured object A so as to optimize the chromaticity of the measured object A, the colorimeter 1 can adjust the production process of the measured object A to optimize the chromaticity of the measured object A. The colorimeter 1 can thus improve the quality of the measured object A produced on the production line.

While the presently disclosed techniques have been described by way of the drawings and the embodiments, various changes and modifications may be easily made by those of ordinary skill in the art based on the present disclosure. Such changes and modifications are therefore included in the scope of the present disclosure. For example, the functions included in the components, steps, etc. may be rearranged without logical inconsistency, and a plurality of components, steps, etc. may be combined into one component, step, etc. and a component, step, etc. may be divided into a plurality of components, steps, etc.

For example, the presently disclosed techniques can be implemented as programs including processes for achieving the functions of the colorimeter 1 or storage media storing such programs, which are also included in the scope of the present disclosure.

For example, the shape, position, orientation, and number of each component described above are not limited to those in the above description and the illustration in the drawings. The shape, position, orientation, and number of each component may be freely set as long as its functions can be achieved.

Although the foregoing embodiment describes the case where the center wavelength of the second spectrum S2 is located at the tail of the first spectrum S1, the present disclosure is not limited to such. The center wavelength of the second spectrum S2 may be located at the dip of the first spectrum S1.

Although the foregoing embodiment describes the case where, when the irradiation light includes the first irradiation light, the second irradiation light, and the third irradiation light, the controller 50 in the colorimeter 1 controls the first light source unit 11, the second light source unit 12, and the third light source unit 13 to emit the first irradiation light, the second irradiation light, and the third irradiation light simultaneously, the present disclosure is not limited to such. The controller 50 may control the first light source unit 11, the second light source unit 12, and the third light source unit 13 to emit only one or two out of the first irradiation light, the second irradiation light, and the third irradiation light.

For example, to measure the actual reflectance of the measured object A at a wavelength of 700 nm, the colorimeter 1 may turn off the first light source unit 11 and the third light source unit 13 and turn on only the second light source unit 12 with a wavelength of 700 nm. In such a case, since the measured object A is not excited, for example, at a wavelength of 450 nm, fluorescence is not generated from the measured object A at a wavelength of 700 nm. Accordingly, the colorimeter 1 can easily measure the actual reflectance of the measured object A at a wavelength of 700 nm based on the second irradiation light from the second light source unit 12.

Thus, by turning on only one of the second light source unit 12 and the third light source unit 13, the colorimeter 1 can easily measure the actual reflectance of the measured object A while suppressing the influence of fluorescence from the measured object A in the observation wavelength region.

Although the foregoing embodiment describes the case where, when the irradiation light includes the first irradiation light, the second irradiation light, and the third irradiation light, the controller 50 in the colorimeter 1 controls the first light source unit 11, the second light source unit 12, and the third light source unit 13 to emit the first irradiation light, the second irradiation light, and the third irradiation light simultaneously, the present disclosure is not limited to such. The controller 50 may control the first light source unit 11, the second light source unit 12, and the third light source unit 13 to emit the first irradiation light, the second irradiation light, and the third irradiation light at irradiation timings different from each other.

For example, the controller 50 may first turn on only the first light source unit 11 to emit only the first irradiation light, and then turn on only the second light source unit 12 to emit only the second irradiation light. If the apparent reflectance at a wavelength of 700 nm is 15% when only the first irradiation light is emitted first and the actual reflectance at a wavelength of 700 nm is 10% when only the second irradiation light is emitted subsequently, the controller 50 can calculate the amount of light corresponding to the difference of 5% as the fluorescence intensity. Here, the excitation wavelength need not be specifically identified.

Thus, by comparing the data when only the first light source unit 11 is turned on and the data when only one of the second light source unit 12 and the third light source unit 13 as auxiliary light sources is turned on, the colorimeter 1 can easily measure the fluorescence intensity caused by the white LED light source included in the first light source unit 11.

Although the foregoing modifications described the case where the irradiation light includes the first irradiation light, the second irradiation light, and the third irradiation light, the same description applies to the case where the irradiation light includes only the first irradiation light and the second irradiation light, and to the case where the irradiation light includes four or more types of light.

Although the foregoing embodiment describes the case where the colorimeter 1 includes the third light source unit 13 and the irradiation light includes the first irradiation light, the second irradiation light, and the third irradiation light, the present disclosure is not limited to such. The colorimeter 1 may include only the first light source unit 11 and the second light source unit 12 without the third light source unit 13.

Alternatively, the colorimeter 1 may include a fourth light source unit in addition to the first light source unit 11, the second light source unit 12, and the third light source unit 13. The fourth light source unit may emit fourth irradiation light having a fourth spectrum different from the first spectrum S1, the second spectrum S2, and the third spectrum S3. The fourth light source unit may include an LED light source with a peak wavelength of 775 nm and a full width at half maximum of 50 nm. Thus, the colorimeter 1 can expand the wavelength band of the superimposed spectrum S to the longer wavelength side than a wavelength of 750 nm, and measure the reflectance of the measured object A in a wider wavelength region.

Although the foregoing embodiment describes the case where the center wavelength of the third spectrum S3 is located at the dip of the first spectrum S1, the present disclosure is not limited to such. The center wavelength of the third spectrum S3 may be located at the tail of the first spectrum S1.

Although the foregoing embodiment describes the case where the first light source unit 11 includes a white LED light source and the first irradiation light includes white light, the present disclosure is not limited to such. The first spectrum S1 of the first irradiation light may have any wavelength band in the visible light region. The first light source unit 11 may include any visible light source that emits such first irradiation light. Likewise, the second light source unit 12 and the third light source unit 13 are not limited to LED light sources, and may include any visible light sources.

Although the foregoing embodiment describes the case where the measured light includes reflected light resulting from diffuse reflection of the irradiation light by the measured object A, the present disclosure is not limited to such. The measured light may include specularly reflected light or transmitted light as long as the chromaticity can be measured by the colorimeter 1.

Although the foregoing embodiment describes the case where the superimposed spectrum S corresponds to the reference spectrum S0 of the D65 standard light source as the reference for calculating the chromaticity, the present disclosure is not limited to such. The reference standard light source is not limited to the D65 standard light source, and may include any other standard light source.

Although the foregoing embodiment describes the case where the colorimeter 1 feedback-controls the upstream operation ends in the production line of the measured object A, the present disclosure is not limited to such. The colorimeter 1 may not perform such feedback control. The user may manually adjust these operation ends.

Although the foregoing embodiment describes the case where the measured object A includes paper as an example, the present disclosure is not limited to such. The measured object A may include any measured object that can be subjected to chromaticity measurement.

The present disclosure provides:

(1) A colorimeter configured to measure a chromaticity of a measured object, the colorimeter comprising: a first light source unit configured to emit first irradiation light having a first spectrum; a second light source unit configured to emit second irradiation light having a second spectrum different from the first spectrum; an integrating sphere configured to have irradiation light including the first irradiation light and the second irradiation light incident thereon; a light receiver configured to detect measured light resulting from irradiation of the measured object with the irradiation light emitted from the integrating sphere; and a controller configured to calculate an optical spectrum of the measured light based on a detection signal of the measured light, wherein a superimposed spectrum of the first spectrum and the second spectrum corresponds to a reference spectrum of a standard light source as a reference for calculating the chromaticity.

(2) In the colorimeter according to (1), a center wavelength of the second spectrum may be located at a tail or a dip of the first spectrum.

(3) The colorimeter according to (1) or (2) may comprise a third light source unit configured to emit third irradiation light having a third spectrum different from the first spectrum and the second spectrum, the irradiation light may include the first irradiation light, the second irradiation light, and the third irradiation light, and a superimposed spectrum of the first spectrum, the second spectrum, and the third spectrum may correspond to the reference spectrum.

(4) In the colorimeter according to (3), a center wavelength of the third spectrum may be located at a tail or a dip of the first spectrum.

(5) In the colorimeter according to any one of (1) to (4), the first light source unit may include a white LED light source, and the first irradiation light may include white light.

(6) In the colorimeter according to any one of (1) to (5), the measured light may include reflected light resulting from diffuse reflection of the irradiation light by the measured object.

(7) In the colorimeter according to any one of (1) to (6), the superimposed spectrum may correspond to a reference spectrum of a D65 standard light source as the reference for calculating the chromaticity.

(8) In the colorimeter according to any one of (1) to (7), the controller may be configured to, in the case where the chromaticity of the measured object is determined to be inappropriate, feedback-control an upstream operation end in a production line of the measured object to optimize the chromaticity.

The present disclosure provides:

(9) A chromaticity measurement method of measuring a chromaticity of a measured object, the chromaticity measurement method comprising: emitting first irradiation light having a first spectrum; emitting second irradiation light having a second spectrum different from the first spectrum; causing irradiation light including the first irradiation light and the second irradiation light to be incident on an integrating sphere; irradiating the measured object with the irradiation light emitted from the integrating sphere; detecting measured light resulting from irradiation of the measured object with the irradiation light emitted from the integrating sphere; and calculating an optical spectrum of the measured light based on a detection signal of the measured light, wherein a superimposed spectrum of the first spectrum and the second spectrum corresponds to a reference spectrum of a standard light source as a reference for calculating the chromaticity.

The invention claimed is:

1. A colorimeter configured to measure a chromaticity of a measured object, the colorimeter comprising:

a first light source unit configured to emit first irradiation light having a first spectrum;

a second light source unit configured to emit second irradiation light having a second spectrum different from the first spectrum;

a third light source unit configured to emit third irradiation light having a third spectrum different from the first spectrum and the second spectrum;

an integrating sphere configured to have irradiation light including the first irradiation light, the second irradiation light, and the third irradiation light incident thereon;

a light receiver configured to detect measured light resulting from irradiation of the measured object with the irradiation light emitted from the integrating sphere; and a controller configured to calculate an optical spectrum of the measured light based on a detection signal of the measured light, wherein a superimposed spectrum of the first spectrum, the second spectrum, and the third spectrum corresponds to a reference spectrum of a D65 standard light source as a reference for calculating the chromaticity, wherein the second light source unit and the third light source unit emit light in wavelength regions in which the first spectrum is depressed as compared with the D65 standard light source, wherein a center wavelength of the second spectrum is located, in a visible light wavelength region, at a tail of the first spectrum, wherein a center wavelength of the third spectrum is located, in the visible light wavelength region, at a dip of the first spectrum, and wherein a profile of the superimposed spectrum is approximated to a profile of the reference spectrum in an entire visible light wavelength region of the reference spectrum.

2. The colorimeter according to claim 1, wherein the first light source unit includes a white LED light source, and the first irradiation light includes white light.

3. The colorimeter according to claim 1, wherein the measured light includes reflected light resulting from diffuse reflection of the irradiation light by the measured object.

4. The colorimeter according to claim 1, wherein the controller is configured to, in the case where the chromaticity of the measured object is determined to be inappropriate, feedback-control an upstream operation end in a production line of the measured object to optimize the chromaticity.

5. A chromaticity measurement method of measuring a chromaticity of a measured object, the chromaticity measurement method comprising:

emitting first irradiation light having a first spectrum;

emitting second irradiation light having a second spectrum different from the first spectrum;

emitting third irradiation light having a third spectrum different from the first spectrum and the second spectrum;

causing irradiation light including the first irradiation light, the second irradiation light, and the third irradiation light to be incident on an integrating sphere;

irradiating the measured object with the irradiation light emitted from the integrating sphere;

detecting measured light resulting from irradiation of the measured object with the irradiation light emitted from the integrating sphere; and calculating an optical spectrum of the measured light based on a detection signal of the measured light, wherein a superimposed spectrum of the first spectrum, the second spectrum, and the third spectrum corresponds to a reference spectrum of a standard light source as a D65 reference for calculating the chromaticity, wherein the second irradiation light and the third irradiation light are in wavelength regions in which the first spectrum is depressed as compared with the D65 standard light source, wherein a center wavelength of the second spectrum is located, in a visible light wavelength region, at a tail of the first spectrum, wherein a center wavelength of the third spectrum is located, in the visible light wavelength region, at a dip of the first spectrum, and wherein a profile of the superimposed spectrum is approximated to a profile of the reference spectrum in an entire visible light wavelength region of the reference spectrum.

* * * * *